US012780288B2

(12) United States Patent
Ohashi et al.

(10) Patent No.: US 12,780,288 B2
(45) Date of Patent: Nov. 3, 2026

(54) STEERING ASSIST DEVICE

(71) Applicant: SUBARU CORPORATION, Tokyo (JP)

(72) Inventors: Yuto Ohashi, Tokyo (JP); Takashi Omikawa, Tokyo (JP); Katsumi Takahashi, Tokyo (JP); Kouichi Enomoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/184,671

(22) Filed: Apr. 21, 2025

(65) Prior Publication Data

US 2025/0353540 A1 Nov. 20, 2025

(30) Foreign Application Priority Data

May 14, 2024 (JP) ................................ 2024-078409

(51) Int. Cl.
*B62D 1/28* (2006.01)

(52) U.S. Cl.
CPC .................................. *B62D 1/286* (2013.01)

(58) Field of Classification Search
CPC . B62D 1/286; B60W 30/12; B60W 30/18145; B60W 50/00; B60W 2050/0005
See application file for complete search history.

(56) References Cited

U.S. PATENT DOCUMENTS

| | | | | |
|---|---|---|---|---|
| 6,542,800 | B2 * | 4/2003 | Kawazoe | B60W 30/12 701/28 |
| 10,081,358 | B2 * | 9/2018 | Shimizu | B60W 30/12 |
| 10,839,689 | B2 * | 11/2020 | Mizoguchi | B60W 50/10 |
| 11,203,380 | B2 * | 12/2021 | Suzuki | B62D 5/046 |
| 11,724,695 | B2 * | 8/2023 | Lidander | B60W 30/0956 701/41 |
| 12,233,867 | B2 * | 2/2025 | Kim | B60W 30/12 |
| 12,428,058 | B2 * | 9/2025 | Caldwell | B60W 30/12 |
| 2010/0145575 | A1 * | 6/2010 | Switkes | B62D 15/025 701/41 |
| 2011/0251758 | A1 * | 10/2011 | Kataoka | B62D 15/025 701/41 |

(Continued)

FOREIGN PATENT DOCUMENTS

JP 2010-089692 A 4/2010

*Primary Examiner* — Tyler J Lee
(74) *Attorney, Agent, or Firm* — Rimon P.C.

(57) ABSTRACT

A steering assist device that controls steering to keep a vehicle in a lane includes one or more processors, and one or more storage media storing a program executed by the one or more processors. The program includes one or more instructions that cause the one or more processors to execute a control torque calculating process that calculates a steering control torque corresponding to a steering wheel angle determined in accordance with a traveling condition; a determining process that determines whether an override, which is a driver's steering action during steering assist, has occurred; a torque limit calculating process that calculates a limit value for the steering control torque based on the traveling condition; and a torque instruction process that limits, upon the override, the calculated steering control torque with the calculated limit value and gives the limited steering control torque as an instruction to a vehicle's steering mechanism.

7 Claims, 7 Drawing Sheets

(56) References Cited

U.S. PATENT DOCUMENTS

| | | | | |
|---|---|---|---|---|
| 2012/0197496 | A1* | 8/2012 | Limpibunterng | B62D 1/286 701/42 |
| 2013/0060414 | A1* | 3/2013 | Lee | B62D 1/286 701/23 |
| 2016/0107645 | A1* | 4/2016 | Okuda | B60W 30/12 701/41 |
| 2017/0066475 | A1* | 3/2017 | Kudo | B62D 6/10 |
| 2018/0186372 | A1* | 7/2018 | Shimizu | B60W 30/12 |
| 2019/0047621 | A1* | 2/2019 | Kim | B62D 15/025 |
| 2019/0084581 | A1* | 3/2019 | Miura | B60W 50/00 |
| 2019/0256140 | A1* | 8/2019 | Suzuki | B62D 5/091 |
| 2020/0255012 | A1* | 8/2020 | Sato | B60W 30/16 |
| 2021/0155232 | A1* | 5/2021 | Ike | B60W 10/20 |
| 2022/0234582 | A1* | 7/2022 | Kim | B62D 15/025 |
| 2022/0234651 | A1* | 7/2022 | Wu | G06N 3/04 |
| 2023/0399049 | A1* | 12/2023 | Caldwell | B60W 30/12 |
| 2024/0182084 | A1* | 6/2024 | Nikolov | B60W 30/12 |
| 2024/0182109 | A1* | 6/2024 | Goetz | B62D 5/0463 |

* cited by examiner

STEERING ASSIST DEVICE

CROSS-REFERENCE TO RELATED APPLICATIONS

The present application claims priority from Japanese Patent Application No. 2024-078409 filed on May 14, 2024, the entire contents of which are hereby incorporated by reference.

BACKGROUND

The disclosure relates to a steering assist device that controls a vehicle so that it travels in a lane.

Japanese Unexamined Patent Application Publication No. 2010-89692 discloses a technique related to a steering assist device that applies a steering torque to a steering mechanism of a vehicle to assist steering. When it is determined, in this technique, that a driver who drives the vehicle has performed a steering action, a limit value for the change rate of the steering torque for steering control is set smaller than that when it is determined that no steering action has been performed, so that the output of the steering torque is reduced.

SUMMARY

An aspect of the disclosure provides a steering assist device configured to control steering to keep a vehicle in a lane. The steering assist device includes one or more processors and one or more storage media configured to store a program configured to be executed by the one or more processors. The program includes one or more instructions. The one or more instructions are configured to cause the one or more processors to execute a control torque calculating process, a determining process, a torque limit calculating process, and a torque instruction process. The control torque calculating process calculates a steering control torque corresponding to a steering wheel angle determined in accordance with a traveling condition. The determining process determines whether an override has occurred. The override is a steering action performed, during steering assist, by a driver who drives the vehicle. The torque limit calculating process calculates a limit value for the steering control torque based on the traveling condition. When the determining process determines that the override has occurred, the torque instruction process limits the steering control torque calculated in the control torque calculating process with the limit value calculated in the torque limit calculating process, and gives the limited steering control torque as an instruction to a steering mechanism of the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

A steering action performed by the driver when the vehicle is performing lane centering, a so-called lane keeping control operation, through steering assist, is referred to as an override. In an override, the driver feels that steering is heavier than normal steering. A possible way to improve such a steering feel may be to reduce a steering control torque for a lane keeping control operation during an override.

However, if a steering feel during an override is made too light, for example, a driver's unintended override action at the entrance of, or during driving on, a curved road may be determined to be an override and this may lead to improper lane centering. For example, if the driver is firmly holding a steering wheel when steering assist indicates, as an instruction, a steering torque to the left in a lane curving to the left, the output of a torque sensor may cause an erroneous determination that the driver is steering to the right.

Accordingly, the disclosure proposes a technique that changes a steering feel of an override during execution of steering assist in accordance with a traveling condition.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

<Device Configuration>

Figure 1:
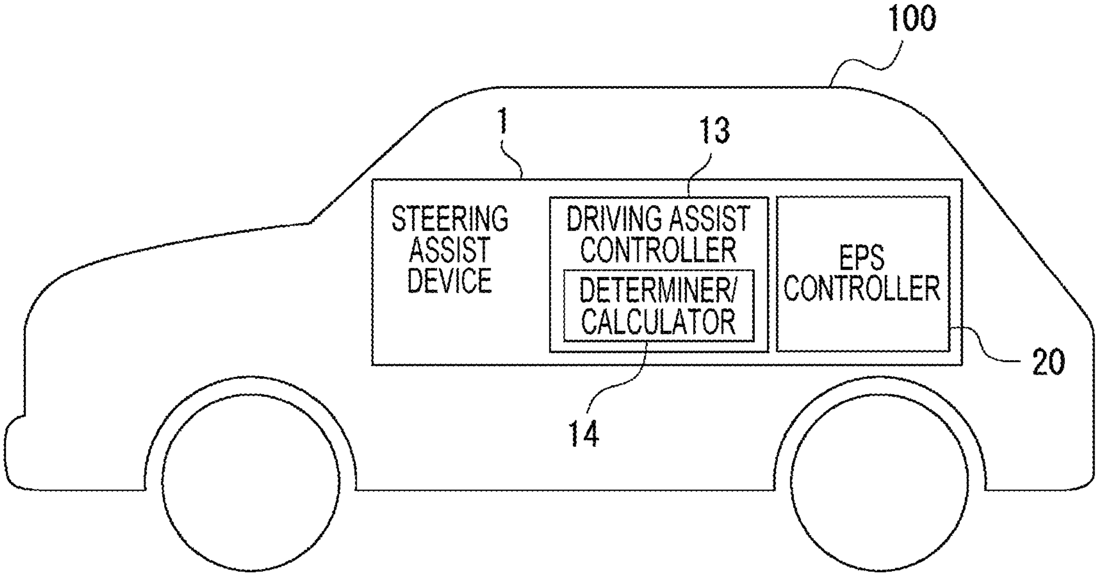
FIG. 1 is an explanatory diagram of a vehicle including a steering assist device according to an embodiment of the disclosure.
Figure 2:
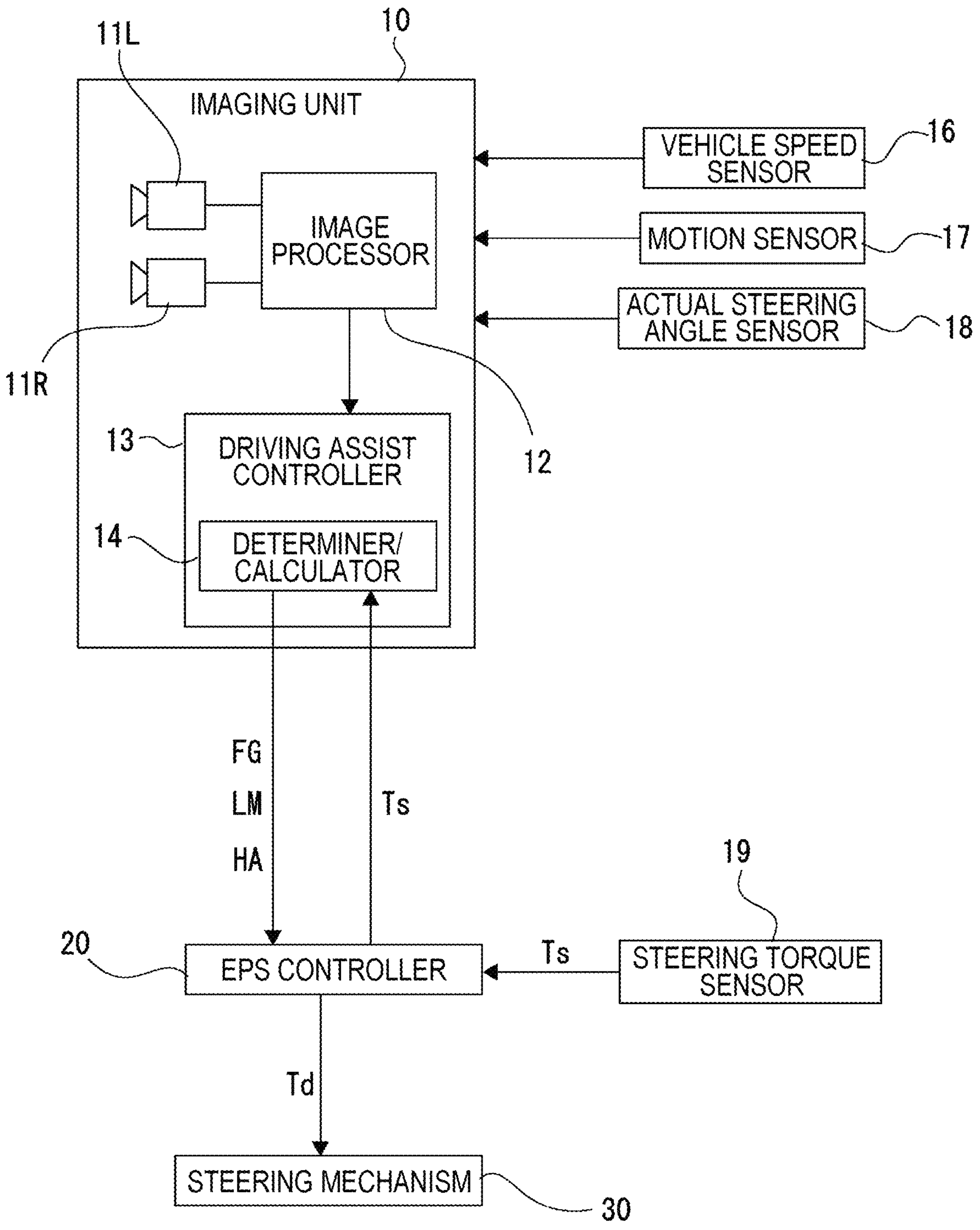
FIG. 2 is an explanatory diagram illustrating an exemplary configuration of the steering assist device according to the embodiment.

FIG. 1 is a diagram illustrating a general configuration of a vehicle 100 that includes a steering assist device 1 according to the embodiment. FIG. 2 is an explanatory diagram of an exemplary configuration including the steering assist device 1 and related components.

The vehicle 100 is configured, for example, as a four-wheeled automobile and includes one or both of an engine and a traveling motor as a drive source of wheels. That is, the vehicle 100 may be configured as an electric vehicle (EV) including the traveling motor as a drive source of wheels, a hybrid electric vehicle (HEV) including both the engine and the traveling motor as a drive source of wheels, or an engine vehicle including the engine as a drive source of wheels.

As illustrated in FIG. 1, the steering assist device 1 of the vehicle 100 includes a driving assist controller 13 and an electric power steering (EPS) controller 20.

The driving assist controller 13 controls a steering assist, and also controls other assists related to various functions, such as a collision avoidance function, a collision damage mitigation function, a navigation function, and a communication function. In this example, a determiner/calculator 14, which is part of the function of the driving assist controller 13, and the EPS controller 20 work together to provide the functions of the steering assist device 1. The determiner/calculator 14 is presented as a software function that performs a determining process and a calculating process related to EPS control.

The configuration in which the driving assist controller 13 (determiner/calculator 14) and the EPS controller 20, each including a processor, work together to perform the functions of the steering assist device 1 is merely an example. A device unit including a single processor may be configured to perform the same functions as those described below.

FIG. 2 illustrates the driving assist controller 13 and the EPS controller 20, which serve as the steering assist device 1, and their peripheral components.

For example, the driving assist controller 13 is included in an imaging unit 10.

The imaging unit 10 includes an imager 11L and an imager 11R installed to be able to capture images in the direction of travel (forward) of the vehicle 100, an image processor 12, and the driving assist controller 13.

A vehicle speed sensor 16, a motion sensor 17, and an actual steering angle sensor 18 are coupled to the imaging unit 10. The image processor 12 and the driving assist controller 13 included in the imaging unit 10 are configured to be able to receive detection signals from these sensors.

The vehicle speed sensor 16 is a sensor configured to detect the speed of the vehicle 100.

The motion sensor 17 collectively refers to sensors configured to detect the motion of the vehicle 100, such as a yaw rate (angular speed) sensor, an acceleration sensor, and a sensor capable of measuring a turning angular speed and acceleration.

The actual steering angle sensor 18 detects an actual cutting angle of the steering wheel (e.g., an angle relative to the longitudinal axis of the vehicle 100) as an actual steering angle.

The steering torque sensor 19 detects, for example, an input torque on a steering shaft, so as to detect a steering force (steering input torque) received from the driver through the steering wheel.

The imagers 11L and 11R of the imaging unit 10 are arranged, for example, near the upper part of a windshield of the vehicle 100, with a predetermined distance therebetween in the vehicle-width direction, in such a way that distance measurement can be made by a so-called stereo method. The imagers 11L and 11R have optical axes parallel to each other and have the same focal length. Frame periods are synchronized, and frame rates are the same.

An electric signal (captured image signal) obtained by each imaging element of the imagers 11L and 11R is analog-to-digital (A/D) converted into a digital image signal (captured image data), which represents a luminance value of a predetermined gradation for each pixel. The captured image data is, for example, color image data.

The image processor 12 includes a microcomputer including, for example, a central processing unit (CPU), a read-only memory (ROM), and a random-access memory (RAM) serving as a work area. The CPU executes various processes in accordance with programs stored in the ROM.

The image processor 12 stores, in an internal memory, each frame image data as captured image data that the imagers 11L and 11R have obtained by capturing an image forward of the vehicle 100. Then, on the basis of two pieces of captured image data constituting each frame, the image processor 12 executes processes for recognizing an environment outside the vehicle 100, such as various processes for recognizing objects that are present forward of the vehicle 100. For example, the image processor 12 recognizes regulatory lines (e.g., white lines, orange lines) drawn on a road; preceding vehicles, pedestrians, obstacles; and three-dimensional objects, such as, guard rails, curbs, and side walls running along the road.

Here, the regulatory lines refer to lines that define the traveling lane of the vehicle 100. The image processor 12 recognizes the traveling lane of the vehicle 100 (vehicle's traveling lane) on the basis of information of the regulatory lines recognized.

Image recognition result information, such as location, speed, and acceleration information of three-dimensional objects and traveling lane information of the vehicle, obtained by the image processor 12, are used to control various driving assists.

To recognize the surroundings of the vehicle, a distance measuring sensor capable of recognizing the surroundings of the vehicle, such as a radio detecting and ranging (RADAR) sensor or a light detection and ranging (LIDAR) sensor, may be added to, or replaced with, the imagers 11L and 11R.

The driving assist controller 13 performs control for various driving assists on the basis of the image recognition result information obtained by the image processor 12.

As also illustrated in FIG. 1, in the present embodiment, the driving assist controller 13 includes the determiner/calculator 14 as a configuration for EPS control, particularly for lane keeping control. The determiner/calculator 14 is configured to perform determination and calculation for lane keeping control. That is, the determiner/calculator 14 performs a process that determines whether an override has occurred during lane keeping control by the EPS controller 20, and a process that sets a limit value for a steering control torque in accordance with a traveling condition.

The EPS controller 20 includes, for example, a microcomputer and is configured to control an EPS motor in a steering mechanism 30 on the basis of a steering instruction value (steering wheel angle HA) from the driving assist controller 13 (determiner/calculator 14) and a torque sensor value Ts, which is a detection value of the steering torque sensor 19. For example, for the steering mechanism 30, the EPS controller 20 calculates a steering control torque corresponding to the steering wheel angle HA for lane centering, and outputs the steering control torque as an instruction torque Td to the steering mechanism 30.

In the steering mechanism 30, the EPS motor is driven on the basis of a current value corresponding to the instruction torque Td, so that steering is performed. As a normal power steering operation, the EPS controller 20 determines a steering instruction current value so as to obtain a steering assist torque corresponding to the torque sensor value Ts, which is a driver's steering input torque acquired from a detection signal of the steering torque sensor 19. The EPS controller 20 then drives the EPS motor of the steering mechanism 30 on the basis of the steering instruction current value. This provides power steering control that assists driver's steering.

The driver is allowed to steer even during lane keeping control. When steering is performed as an override during lane keeping control, the EPS controller 20 adds up the steering instruction current value based on the instruction torque Td corresponding to the steering wheel angle HA from the determiner/calculator 14 and the steering instruction current value for power steering control determined as described above, so that the EPS motor is driven on the basis of the resulting current value.

For determination of whether an override has occurred, the torque sensor value Ts is also supplied to the determiner/calculator 14.

For control during an override, the determiner/calculator 14 transmits an override control flag FG and a limit value LM for a control torque to the EPS controller 20.

<Steering Torque Control>

Steering torque control during lane keeping control according to the present embodiment will now be described.

Figure 3:
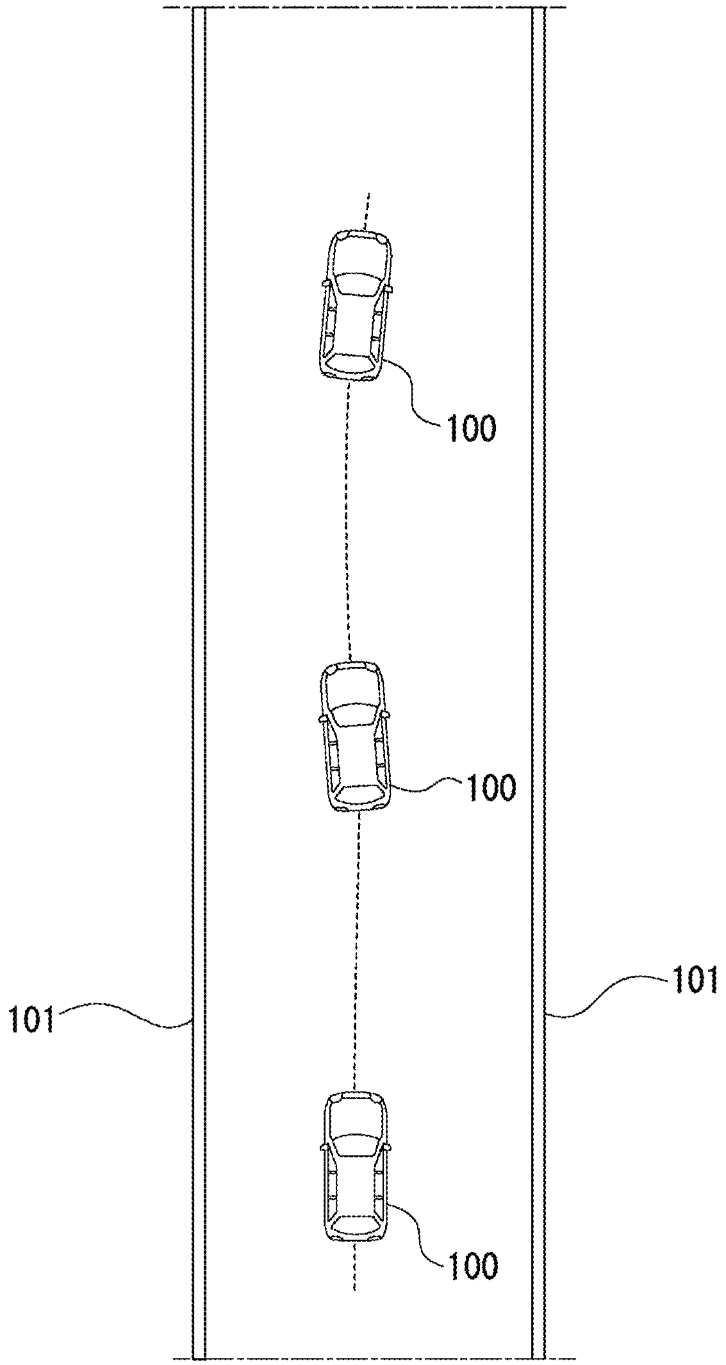
FIG. 3 is an explanatory diagram of lane centering in steering assist according to the embodiment.

FIG. 3 schematically illustrates how lane keeping control is performed, particularly when there is no override. To keep the vehicle 100 traveling in the lane center, the instruction torque Td corresponding to the steering wheel angle HA determined on the basis of how the imaging unit 10 recognizes a lane line 101 is generated, so that automatic steering control is performed.

When an override is detected, the limit value LM for the instruction torque Td for lane keeping control is changed in accordance with a traveling condition.

Figure 4:
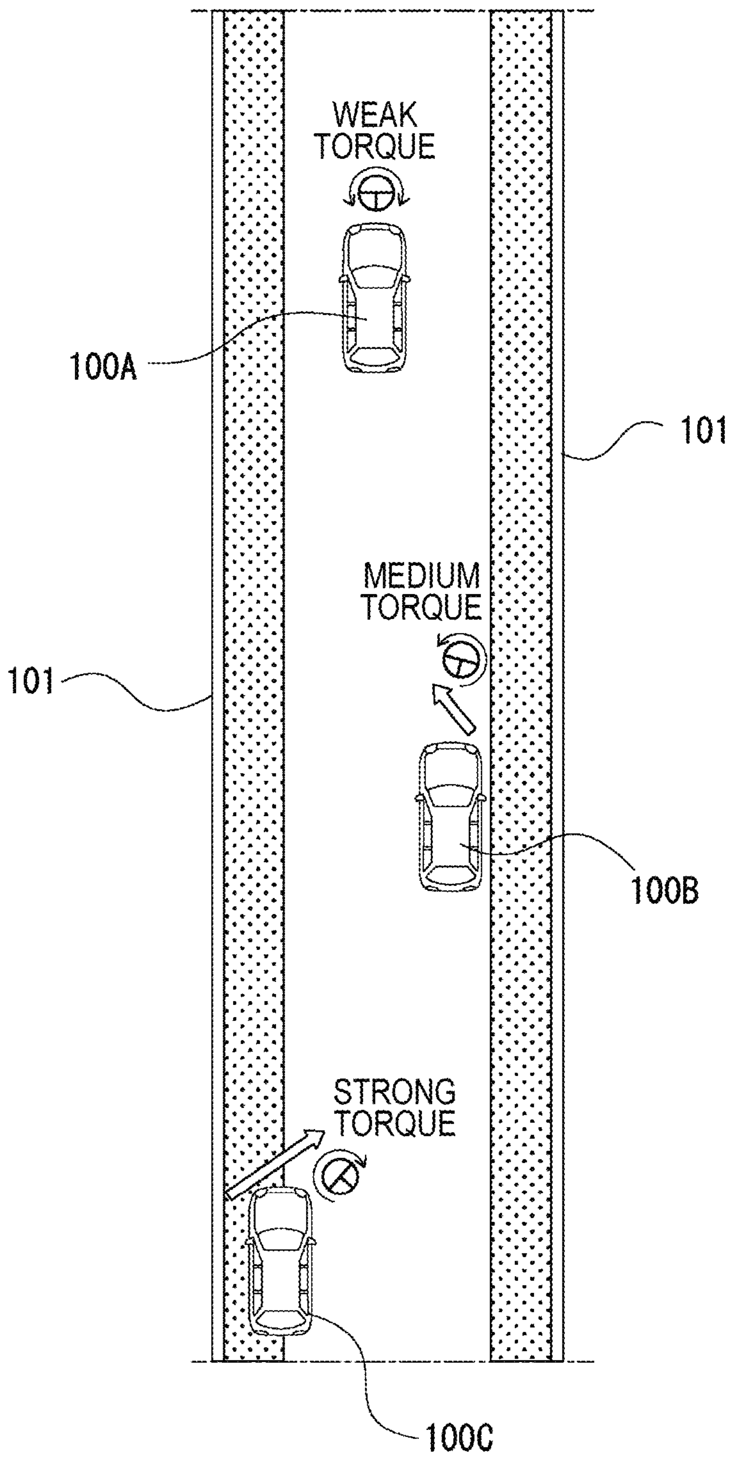
FIG. 4 is an explanatory diagram of torque control performed in accordance with a lateral position according to the embodiment.

FIG. 4 schematically illustrates how the limit value LM for the instruction torque Td is changed in accordance with the lateral position of the vehicle 100, which is a traveling condition. The lateral position refers to the position of the vehicle 100 in the lane in the lateral direction. Vehicles 100A, 100B, and 100C are at different positions in the lateral direction.

The lateral position of the vehicle 100A is substantially the lane center. In this case, the limit value LM for the instruction torque Td is set low, so that the instruction torque Td for lane keeping control is kept low. The driver thus feels that steering to the right and left is relatively light. For example, the instruction torque Td is a weak torque that allows the driver to feel the operation of lane keeping control.

The lateral position of the vehicle 100C is substantially an edge of the lane. In this case, the limit value LM for the instruction torque Td is set high. Therefore, the instruction torque Td becomes strong in accordance with the steering wheel angle HA. This means that a rightward steering torque toward the lane center is large. When intentionally steering to the left, the driver feels that steering is heavy. However, even if a driver's unintended override action is determined to be an override, steering toward the lane center is performed.

The lateral position of the vehicle 100B is substantially intermediate between the vehicle 100A and the vehicle 100C. In this case, the limit value LM for the instruction torque Td is at a medium level. Therefore, the instruction torque Td becomes a medium torque in accordance with the steering wheel angle HA.

Figure 5:
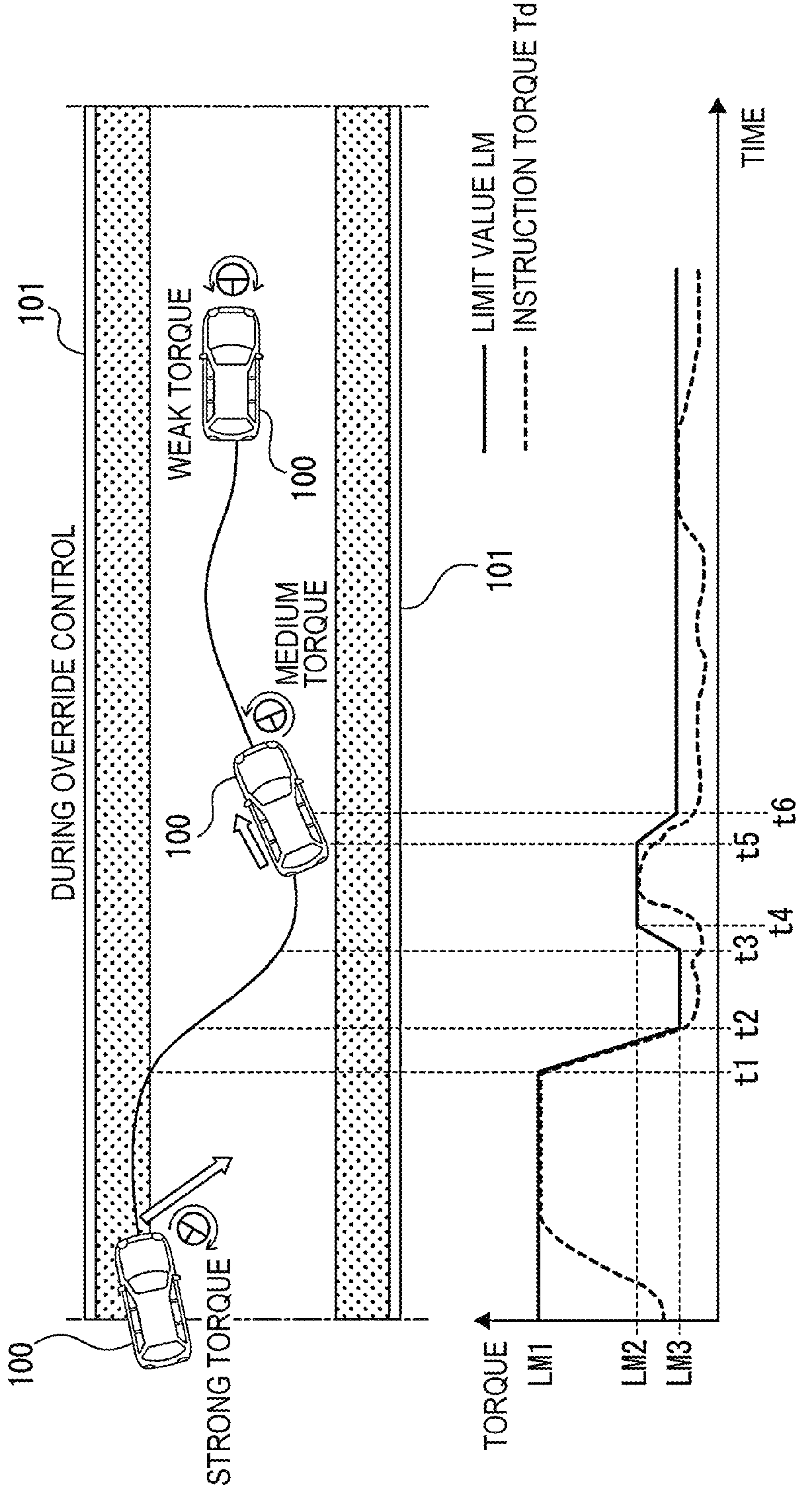
FIG. 5 is an explanatory diagram of torque limit setting performed in accordance with a lateral position according to the embodiment.

FIG. 5 illustrates an example of how the traveling condition (lateral position) of the vehicle 100, the limit value LM, and the instruction torque Td change. The upper part of FIG. 5 illustrates the vehicle 100 at different lateral positions. The lower part of FIG. 5, where the vertical axis represents a torque value and the horizontal axis represents time, illustrates how the instruction torque Td and the limit value LM change with time.

Up to time point t1, the vehicle 100 is at an edge of the lane and located very close to the lane line 101. In this case, the limit value LM is set to a high value LM1, so that the instruction torque Td corresponding to the steering wheel angle HA is output with the limit value LM1 being the upper limit. A strong instruction torque Td for returning to the lane center is output to the steering mechanism 30 where necessary.

The limit value LM is changed as the vehicle 100 approaches the lane center. For example, between time points t2 and t3, where the lateral position of the vehicle 100 is substantially the center, the limit value LM is set to LM3, so that the upper limit of the instruction torque Td is kept to the lowest level.

Between time points t4 and t5, where the lateral position of the vehicle 100 is on one side of the center closer to an edge, the limit value LM is set to LM2, so that the upper limit of the instruction torque Td is at a medium level.

As described above, when it is determined that an override has occurred during lane keeping control, the limit value LM is changed in accordance with the traveling condition. Thus, particularly when there is no risk of lane departure, a lighter steering feel is given to the driver. On the other hand, if there is increased risk of lane departure due to a torque reduction, the instruction torque Td is not limited to a low level.

Figure 6:
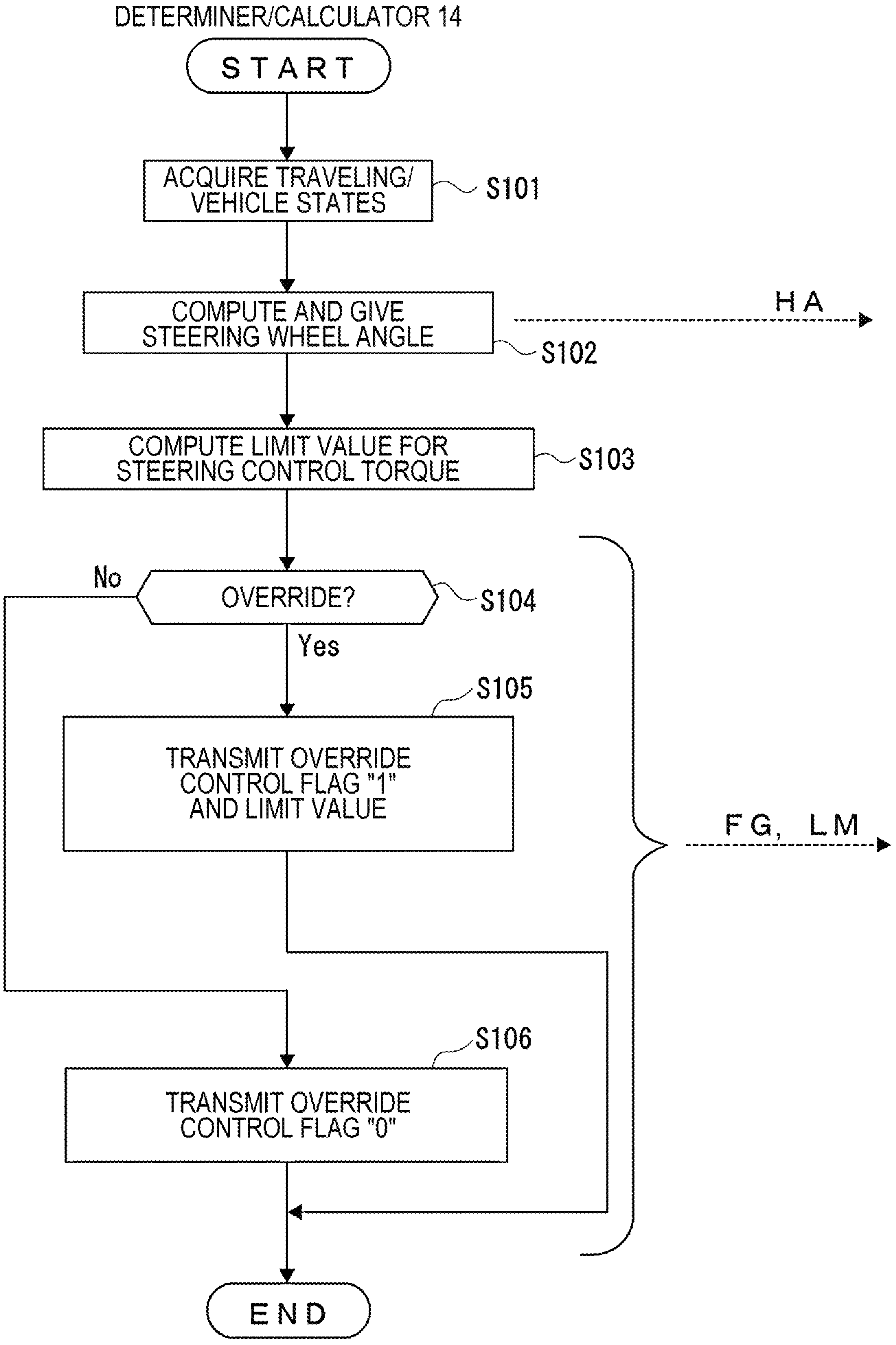
FIG. 6 is a flowchart illustrating an exemplary process performed by a determiner/calculator according to the embodiment.
Figure 7:
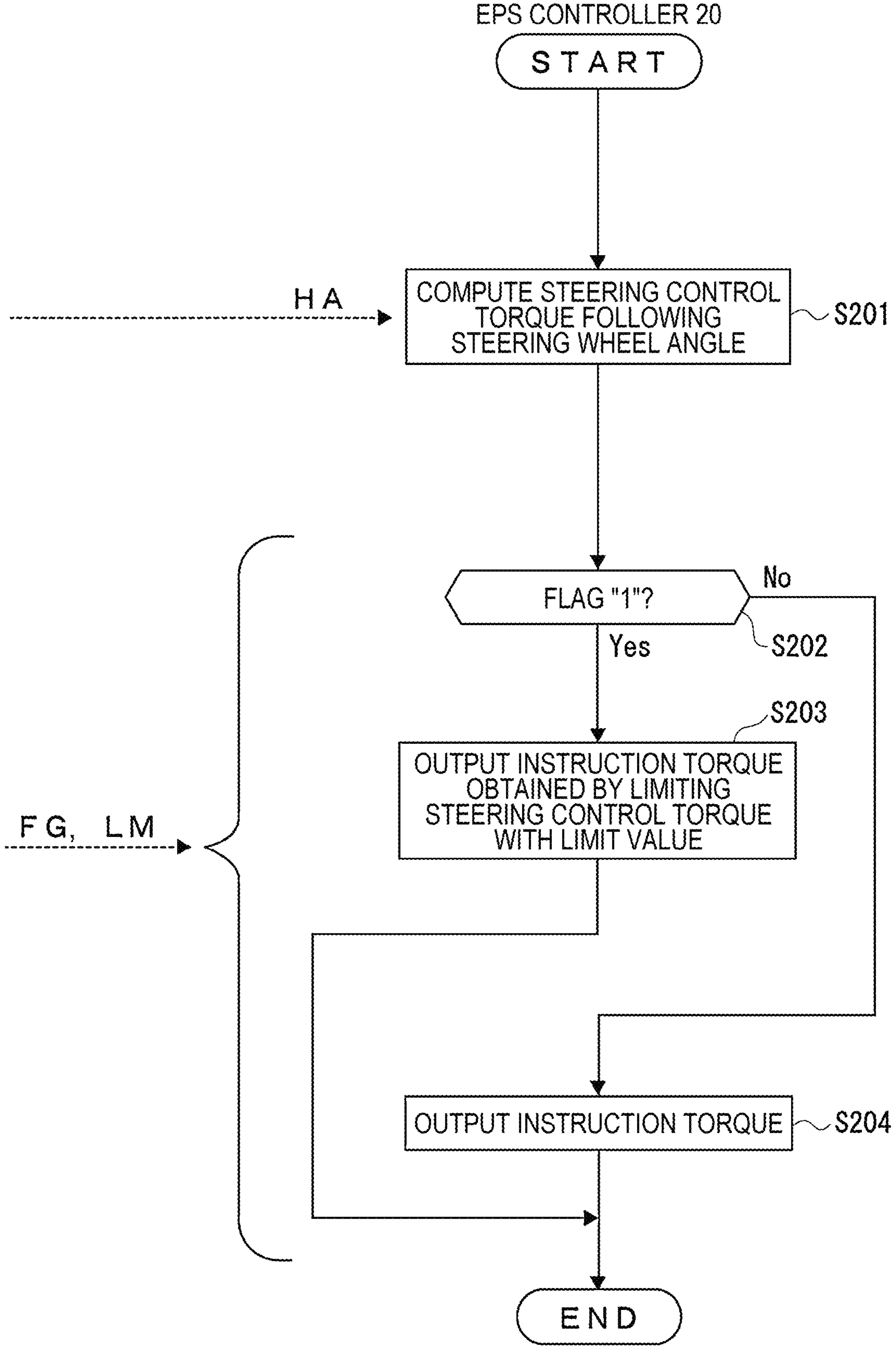
FIG. 7 is a flowchart illustrating an exemplary process performed by an EPS controller according to the embodiment.

FIG. 6 and FIG. 7 illustrate exemplary processes that the determiner/calculator 14 of the driving assist controller 13 and the EPS controller 20 perform for the control operation described above. During lane keeping control, the determiner/calculator 14 and the EPS controller 20 repeat the processes illustrated in FIG. 6 and FIG. 7.

In step S101 of FIG. 6, the determiner/calculator 14 acquires information related to the states of traveling and the vehicle 100. For example, the determiner/calculator 14 acquires image recognition result information, such as information about the vehicle's traveling lane obtained by the image processor 12, and detection information from the vehicle speed sensor 16, the motion sensor 17, and the actual steering angle sensor 18.

In step S102, the determiner/calculator 14 determines a traveling condition on the basis of the information acquired in step S101, and computes the steering wheel angle HA for lane centering in accordance with the traveling condition. The determiner/calculator 14 then gives the resulting steering wheel angle HA to the EPS controller 20.

In step S103, the determiner/calculator 14 computes the limit value LM for the steering control torque (instruction torque Td) for lane keeping on the basis of the traveling condition determined from the information acquired in step S101, such as a lateral position, a curvature, a yaw angle, or a transverse slope.

For example, the determiner/calculator 14 refers to a lateral position determined from image recognition result information, such as vehicle's traveling lane information, obtained by the image processor 12, to set the limit values LM1, LM2, and LM3 illustrated in FIG. 5. If one of the lane lines 101 can no longer be recognized from an image, the determiner/calculator 14 may perform a process that involves retaining lane line information obtained when it was recognizable, determining a lateral position from the lane line information, and calculating the limit value LM.

In step S104, the determiner/calculator 14 determines, from the torque sensor value Ts, whether an override has occurred.

If determining that an override has occurred, the determiner/calculator 14 proceeds to step S105 and transmits, to the EPS controller 20, the override control flag FG set to "1" and the limit value LM calculated in step S103.

If determining that no override has occurred, the determiner/calculator 14 proceeds to step S106 and transmits, to the EPS controller 20, the override control flag FG set to "0".

In step S201 of FIG. 7, the EPS controller 20 calculates s steering control torque that follows the steering wheel angle HA received from the determiner/calculator 14 in step S102.

In step S202, the EPS controller 20 branches the process in accordance with the override control flag FG transmitted from the determiner/calculator 14 in step S105 or step S106.

If the override control flag FG is "1", the EPS controller 20 proceeds to step S203, where the steering control torque calculated in step S201 is limited by the limit value LM and output as the instruction torque Td to the steering mechanism 30. The instruction torque Td is thus limited in accordance with the traveling condition, as described with reference to FIG. 5.

If the override control flag FG is "0", the EPS controller 20 proceeds to step S204, and outputs the steering control torque calculated in step S201 as the instruction torque Td to the steering mechanism 30 without any change.

As in step S204, when no override has occurred, the steering control torque calculated is output as the instruction torque Td without any change. Therefore, the instruction torque Td is not limited in accordance with the traveling condition, as described with reference to FIG. 5. However, there is a limit that prevents a situation where a very high instruction torque Td is output due to an error in computation or the like and the driver cannot steer.

In the process described above, the determiner/calculator 14 computes the limit value LM in accordance with the traveling condition in step S103. Examples of the traveling condition include various information, other than the lateral position described above. Examples of setting the limit value LM in accordance with information of each traveling condition will now be described.

For the lateral position, as described above, the limit value LM is set to the lowest level when the vehicle is in the lane center, and the limit value LM is set higher as the vehicle approaches an edge of the lane.

Examples of the traveling condition related to setting the limit value LM include, in addition to the lateral position, a curvature of the lane, a transverse slope, a yaw angle relative to the lane, and an acceleration of the yaw angle relative to the lane.

The curvature of the lane is the degree to which the lane is curved. A greater curvature is more unfavorable for lane keeping control. Therefore, the limit value LM is set to the lowest level when the lane is straight, and the limit value LM is set higher as the curvature of the lane increases.

The transverse slope is the gradient of the road in the lateral direction. The limit value LM is set low when the gradient decreases toward the lane center, and the limit value LM is set high when the gradient increases toward the lane center.

The yaw angle relative to the lane is the angle of the longitudinal axis of the vehicle relative to the lane line 101. It is desirable that the longitudinal axis of the vehicle be parallel to the lane line 101. Therefore, the limit value LM is set to the lowest level when the longitudinal axis of the vehicle is parallel to the lane line 101, and the limit value LM is set higher after the lane line 101 and the longitudinal axis of the vehicle become no longer parallel and as the angle between them increases.

The acceleration of the yaw angle relative to the lane is the acceleration of change in the angle of the longitudinal axis of the vehicle relative to the lane line 101. The limit value LM is set lower for smaller acceleration, and set higher for greater acceleration.

One of the traveling conditions described above, such as the lateral position, may be used to set the limit value LM, or a computation algorithm combining more than one of the traveling conditions may be used to calculate the limit value LM.

Examples of other traveling conditions that can be used to set the limit value LM include various ones that will affect steering, such as the vehicle speed, the slope of the road in the longitudinal direction, and the road surface conditions.

Effects of Embodiments

The embodiments described above can provide the following effects.

In the steering assist device 1 according to an embodiment, one or more processors execute a control torque calculating process (S201) that calculates a steering control torque corresponding to the steering wheel angle HA determined in accordance with a traveling condition, a determining process (S104) that determines whether an override has occurred, a torque limit calculating process (S103) that calculates the limit value LM for the steering control torque on the basis of the traveling condition, and a torque instruction process (S203) that limits, if it is determined that an override has occurred, the calculated steering control torque with the limit value LM and gives the limited steering control torque as an instruction to the steering mechanism 30.

Thus, during hands-on lane keeping control, the limit value LM used when it is determined that an override has occurred is variably set in accordance with the traveling condition, and the level of the instruction torque Td is controlled in accordance with the traveling condition. Therefore, it is possible to output the instruction torque Td having an appropriate control force (which is less likely to cause lane departure and can facilitate steering) in accordance with the traveling condition. For example, under a condition where there is no safety problem, the limit value LM is reduced to weaken the instruction torque Td, so that a lighter steering feel is given to the driver. On the other hand, under a traveling condition unfavorable for lane keeping, the limit value LM is increased to allow the output of relatively strong instruction torque Td, so that the function of lane centering can be enhanced. That is, it is possible to enhance the function of lane centering and improve the steering feel of an override in accordance with the traveling condition.

In an embodiment, the limit value LM is calculated on the basis of the lateral position of the vehicle in the lane. The lateral position of the vehicle, that is, whether the lateral position in the lane is in the center or close to an edge, is information that can be used to directly determine whether the traveling condition is favorable or unfavorable for the function of lane centering in steering assist. Therefore, the closer the lateral position is to the center, the lower the limit value is set to reduce the instruction torque Td. On the other hand, the closer the lateral position is to an edge, the more unfavorable the traveling condition becomes for lane centering, so that the limit value LM is increased so as not to reduce the instruction torque Td. It is thus possible to control the instruction torque Td that improves a steering feel for the driver, as well as maintaining safety. For example, the driver is not hindered from steering near the lane center, and the vehicle 100 can be returned toward the lane center before the occurrence of lane departure.

In an embodiment, the limit value LM is calculated by referring to one or more of the curvature of the lane, the transverse slope, the yaw angle relative to the lane, and the acceleration of the yaw angle relative to the lane.

The curvature of the lane, the transverse slope, the yaw angle relative to the lane, and the acceleration of the yaw angle relative to the lane each are also information that can be used to determine whether the traveling condition is favorable or unfavorable for the function of lane centering in steering assist. If it can be determined, on the basis of one or more of those described above, that the traveling condition is favorable for lane centering, the limit value LM may be lowered to reduce the instruction torque Td. On the other hand, if it can be determined that the traveling condition is unfavorable for lane centering, the limit value LM is set high so as not to reduce the instruction torque Td. For example, by referring to the curvature of the lane, the limit value LM can be set higher for an override on a curved road than on a straight road, so that unintended departure to the outside of the curved road can be prevented.

In an embodiment, an exemplary process has been described in which a traveling condition is determined from an image captured by the imaging unit 10, and the limit value LM is calculated by referring to the traveling condition determined. For example, the lateral position of the vehicle is determined on the basis of an image from the imaging unit 10. The lateral position can be determined with accuracy by using a captured image.

In an embodiment, the determiner/calculator 14 and the EPS controller 20 work together to perform processes as illustrated in FIG. 6 and FIG. 7. Alternatively, the processes illustrated in FIG. 6 and FIG. 7 may both be performed by one processor.

For example, one processor performs the following process:

Step S101: Acquire traveling/vehicle states;

Steps S102 and S201: Compute the steering wheel angle HA and compute a steering control torque corresponding to the steering wheel angle HA;

step S103: Compute the limit value LM for the steering control torque;

Step S104: Determine whether an override has occurred;

Step S203: Output, if an override has occurred, the instruction torque Td obtained by limiting the calculated steering control torque with the limit value LM; and Step S204: Output, if no override has occurred, the calculated steering control torque as the instruction torque Td without any change.

The processes in FIG. 6 and FIG. 7 are merely an example, and their procedures and details can be variously modified. For example, in FIG. 6, the calculation of the limit value LM in step S103 is followed by a determination in step S104 as to whether an override has occurred. However, the limit value LM may be calculated after a determination as to whether an override has occurred.

The invention claimed is:

1. A steering assist device configured to control steering to keep a vehicle in a lane, the steering assist device comprising:

one or more processors; and one or more storage media configured to store a program configured to be executed by the one or more processors, wherein the program comprises one or more instructions configured to cause the one or more processors to perform:

a control torque calculating process that, during lane keeping control, calculates a steering control torque corresponding to a steering wheel angle determined in accordance with a traveling condition;

a determining process that determines whether an override has occurred, the override being a steering action performed, during the lane keeping control, by a driver of the vehicle;

a torque limit calculating process that determines a lateral position of the vehicle in the lane and calculates an upper limit value for the steering control torque based on the lateral position of the vehicle in the lane as the traveling condition, the upper limit value increasing as a distance between the lateral position of the vehicle and a center of the lane increases; and a torque instruction process that limits, when the determining process determines that the override has occurred, the steering control torque calculated in the control torque calculating process to the upper limit value calculated in the torque limit calculating process, and outputs the limited steering control torque as an instruction to a steering mechanism of the vehicle.

2. The steering assist device according to claim 1, wherein the torque limit calculating process further calculates the upper limit value by using, as the traveling condition, one or more of a curvature of the lane, a transverse slope, a yaw angle relative to the lane, and an acceleration of the yaw angle relative to the lane.

3. The steering assist device according to claim 1, wherein the torque limit calculating process determines the lateral position of the vehicle in the lane from a captured image and calculates the upper limit value based on the lateral position determined from the captured image.

4. The steering assist device according to claim 1, wherein the torque limit calculating process determines the lateral position of the vehicle in the lane based on image recognition result information including traveling lane information obtained from a captured image.

5. The steering assist device according to claim 4, wherein, when a lane line of the lane is not recognized from the captured image, the torque limit calculating process retains lane line information obtained when the lane line was recognized, determines the lateral position of the vehicle in the lane from the retained lane line information, and calculates the upper limit value based on the determined lateral position.

6. The steering assist device according to claim 1, wherein, when the determining process determines that no override has occurred, the torque instruction process outputs the steering control torque calculated in the control torque calculating process as the instruction to the steering mechanism without limiting the steering control torque to the upper limit value.

7. The steering assist device according to claim 1, wherein the torque limit calculating process further calculates the upper limit value based on a yaw angle of the vehicle relative to the lane, the upper limit value increasing as an angle between a longitudinal axis of the vehicle and a lane line increases.

* * * * *